US012318685B2

United States Patent
Morita et al.

(10) Patent No.: US 12,318,685 B2
(45) Date of Patent: Jun. 3, 2025

(54) INPUT DEVICE

(71) Applicant: Sony Interactive Entertainment Inc., Tokyo (JP)

(72) Inventors: Masaho Morita, Tokyo (JP); Hiromasu Kaburaki, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/499,330

(22) Filed: Nov. 1, 2023

(65) Prior Publication Data

US 2024/0058692 A1 Feb. 22, 2024

Related U.S. Application Data

(63) Continuation of application No. 17/294,736, filed as application No. PCT/JP2019/020347 on May 22, 2019, now Pat. No. 11,839,808.

(30) Foreign Application Priority Data

Nov. 30, 2018 (JP) .................................. 2018-225449

(51) Int. Cl.
  *A63F 13/215* (2014.01)
  *A63F 13/24* (2014.01)
  *H04R 1/40* (2006.01)

(52) U.S. Cl.
  CPC ............ *A63F 13/215* (2014.09); *A63F 13/24* (2014.09); *H04R 1/406* (2013.01)

(58) Field of Classification Search
  None
  See application file for complete search history.

(56) References Cited

U.S. PATENT DOCUMENTS

| 8,425,319 B2 | 4/2013 | Sato |
| 8,870,654 B2 | 10/2014 | Nakayama |

(Continued)

FOREIGN PATENT DOCUMENTS

| CN | 103181192 A | 6/2013 |
| CN | 203406910 U | 1/2014 |

(Continued)

OTHER PUBLICATIONS

The First Office Action for corresponding CN Application No. 201980077246, 15 pages dated Jan. 17, 2024.

(Continued)

*Primary Examiner* — Peter J Iannuzzi
(74) *Attorney, Agent, or Firm* — Kilpatrick Townsend & Stockton LLP

(57) ABSTRACT

An exterior member for an input device includes: a housing having an upper surface on which one or more operation members for manipulation by a user are arranged, and a middle portion located between right and left portions, respectively of the housing; a first sound hole extending from an exterior, through the exterior member, to an interior of the housing, the first sound hole allowing sound to propagate to a first location within the housing; a second sound hole extending from the exterior, through the exterior member, to the interior of the housing, the second sound hole allowing sound to propagate to a second location within the housing, wherein a position of the first sound hole and a position of the second sound hole are separated in at least one of the front-rear direction and an up-down direction.

19 Claims, 8 Drawing Sheets

(56) References Cited

U.S. PATENT DOCUMENTS

| | | |
|---|---|---|
| 9,081,545 B1 | 7/2015 | Lin |
| 9,319,786 B2 | 4/2016 | Lee |
| 9,552,840 B2 | 1/2017 | Kim |
| 9,888,317 B2 | 2/2018 | Sassi |
| 10,437,335 B2 | 10/2019 | James |
| 2002/0111216 A1 | 8/2002 | Himoto |
| 2004/0213419 A1 | 10/2004 | Varma |
| 2005/0047611 A1 | 3/2005 | Mao |
| 2005/0159223 A1 | 7/2005 | Tahara |
| 2011/0235822 A1 | 9/2011 | Jeong |
| 2012/0128160 A1 | 5/2012 | Kim |
| 2012/0302344 A1 | 11/2012 | Sato |
| 2013/0178293 A1 | 7/2013 | Nakayama |
| 2013/0343572 A1 | 12/2013 | Lee |
| 2015/0172811 A1 | 6/2015 | Sassi |
| 2015/0205328 A1 | 7/2015 | Lin |
| 2016/0066091 A1 | 3/2016 | Kum |
| 2016/0361640 A1* | 12/2016 | Iwao .................. A63F 13/843 |
| 2017/0340957 A1 | 11/2017 | Cochenour |
| 2018/0041834 A1 | 2/2018 | Kum |
| 2018/0081439 A1 | 3/2018 | James |
| 2019/0270005 A1 | 9/2019 | Gary |

FOREIGN PATENT DOCUMENTS

| | | | |
|---|---|---|---|
| CN | 104368149 A | | 2/2015 |
| CN | 106782584 A | | 5/2017 |
| CN | 108777732 A | | 11/2018 |
| CN | 108883335 A | | 11/2018 |
| EP | 2608198 A1 | | 6/2013 |
| JP | 2007013966 A | | 1/2007 |
| JP | 2007513530 A | | 5/2007 |
| JP | 2012235264 A | | 11/2012 |
| JP | 2012239760 A | | 12/2012 |
| JP | 2012253634 A | | 12/2012 |
| JP | 2013078118 A | | 4/2013 |
| JP | 2015506012 A | | 2/2015 |
| JP | 2015213328 A | | 11/2015 |
| WO | 2005022951 A2 | | 3/2005 |

OTHER PUBLICATIONS

Extended European Search Report for corresponding EP Application No. 23206837.9, 8 pages, dated Mar. 6, 2024.

International Search Report for corresponding PCT Application No. PCT/JP2019/020347, 2 pages, dated Jul. 10, 2019.

International Preliminary Report on Patentability and Written Opinion for corresponding PCT Application No. PCT/JP2019/020347, 14 pages, dated Jun. 10, 2021.

Notice of Reasons for Refusal for corresponding JP Application No. 2020-557544, 7 pages, dated Oct. 15, 2021.

Extended European Search Report for corresponding EP Application No. 19891305.5, 12 pages, dated Sep. 12, 2022.

Anonymous: "Xbox controller—Wikipedia", URL:https://en.wikipedia.org/w/index.php?title=Xbox_controller&oldid=870663939, pp. 1-4, Nov. 26, 2018 (For relevance, see Non-Pat Lit. #4).

Anonymous:"How to hold the Wii Remote?", URL:https://forums.dolphin-emu.org/Thread-how-to-hold-the-wii-remote, pp. 1-3, Dec. 3, 2009 (For relevance, see Non-Pat Lit. #4).

Notice of Reasons for Refusal for corresponding JP Application No. 2022-101193, 6 pages, dated Aug. 7, 2023.

Notice of Reasons for Refusal for corresponding JP Application No. 2024-002411, 10 pages, dated Nov. 25, 2024.

Notification of Decision to Grant a Patent for corresponding CN Application No. 201980077246X, 9 pages, dated Nov. 6, 2024.

* cited by examiner

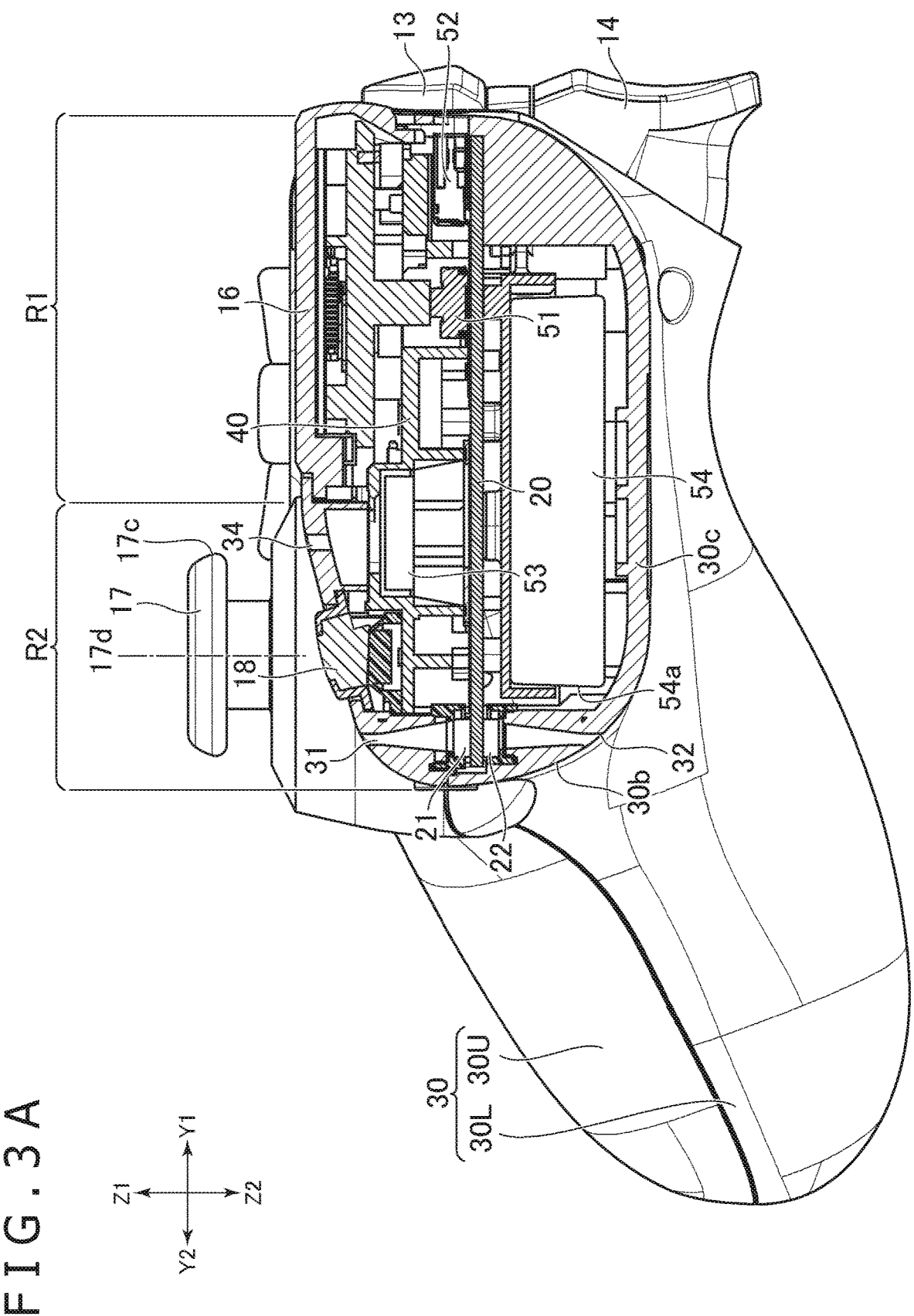

INPUT DEVICE

CROSS REFERENCE TO RELATED APPLICATIONS

This is a continuation application of U.S. patent application Ser. No. 17/294,736, accorded a filing date of May 18, 2021 (allowed); which is a national stage application of International Application No. PCT/JP2019/020347, filed May 22, 2019; which claims priority to Japanese Patent Application No. 2018-225449, filed Nov. 30, 2018, the entire disclosures of which are hereby incorporated by reference.

TECHNICAL FIELD

The present disclosure relates to an input device having a microphone.

BACKGROUND ART

Most of input devices used for game operation have a plurality of operation members such as an operation stick, a push button, a cross key (direction key), and a trigger button. PTL 1 discloses an input device having such operation members and having an audio input function. The input device has a microphone array including a plurality of microphones. In PTL 1, adaptive beamforming processing is executed for a user's speech voice by using audio data obtained from a plurality of microphones.

CITATION LIST

Patent Literature

[PTL 1] PCT Patent Publication No. WO2005/022951

SUMMARY

Technical Problem

While holding the input device, the user puts a finger on the operation member or extends the finger to operate the operation member. Depending on the position of the microphone, the hand holding the input device or the finger operating the operation member may interfere with the sound collection by the microphone, which may hinder the generation of appropriate audio data.

Solution to Problem

The input device proposed in the present disclosure has a right held portion having an upper surface on which a first right operation member operated by a finger of a right hand is arranged, a left held portion having an upper surface on which a first left operation member operated by a finger of a left hand is arranged, a middle portion located between the right held portion and the left held portion, a first microphone arranged inside the middle portion and located behind a center of the middle portion in a front-rear direction, and a second microphone arranged inside the middle portion.

According to the input device, an influence of the hand holding the input device and the finger operating the operation member on the sound collection by the first microphone and the sound collection by the second microphone can be reduced. Further, according to the input device, acquisition performance of the user's speech voice through the first microphone can be improved.

BRIEF DESCRIPTION OF DRAWINGS

FIG. 3A is a cross-sectional view taken along line II-II illustrated in FIG. 1.

DESCRIPTION OF EMBODIMENT

The input device proposed in the present disclosure will be described below. In the present specification, an input device 10 illustrated in FIG. 1A and the like will be described as an example of the input device proposed in the present disclosure. The structure of the input device proposed in the present disclosure is used for operating an information processing device that functions as a game device, for example.

Figure 1A:
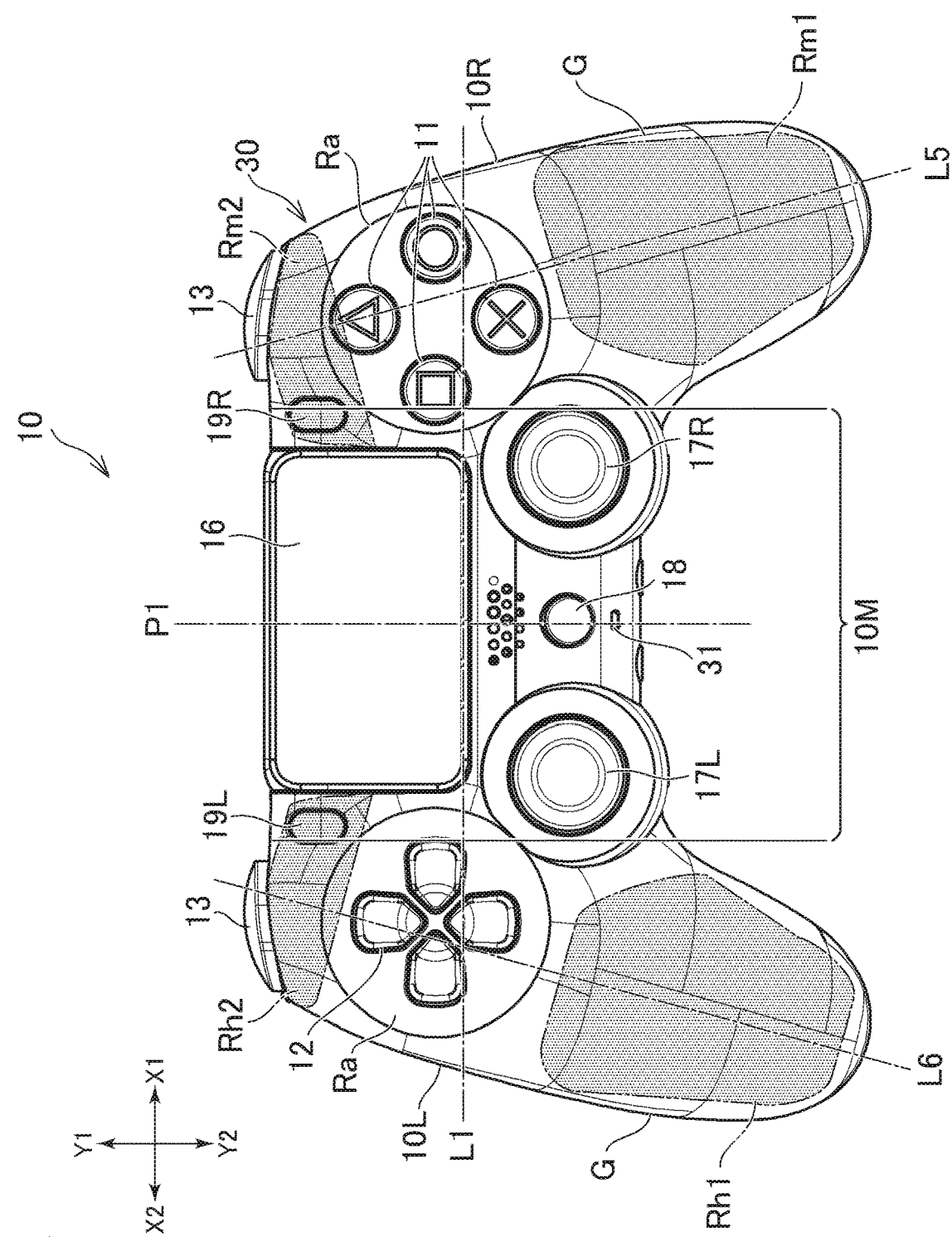
FIG. 1A is a plan view illustrating an example of an input device proposed in the present disclosure.
Figure 2:
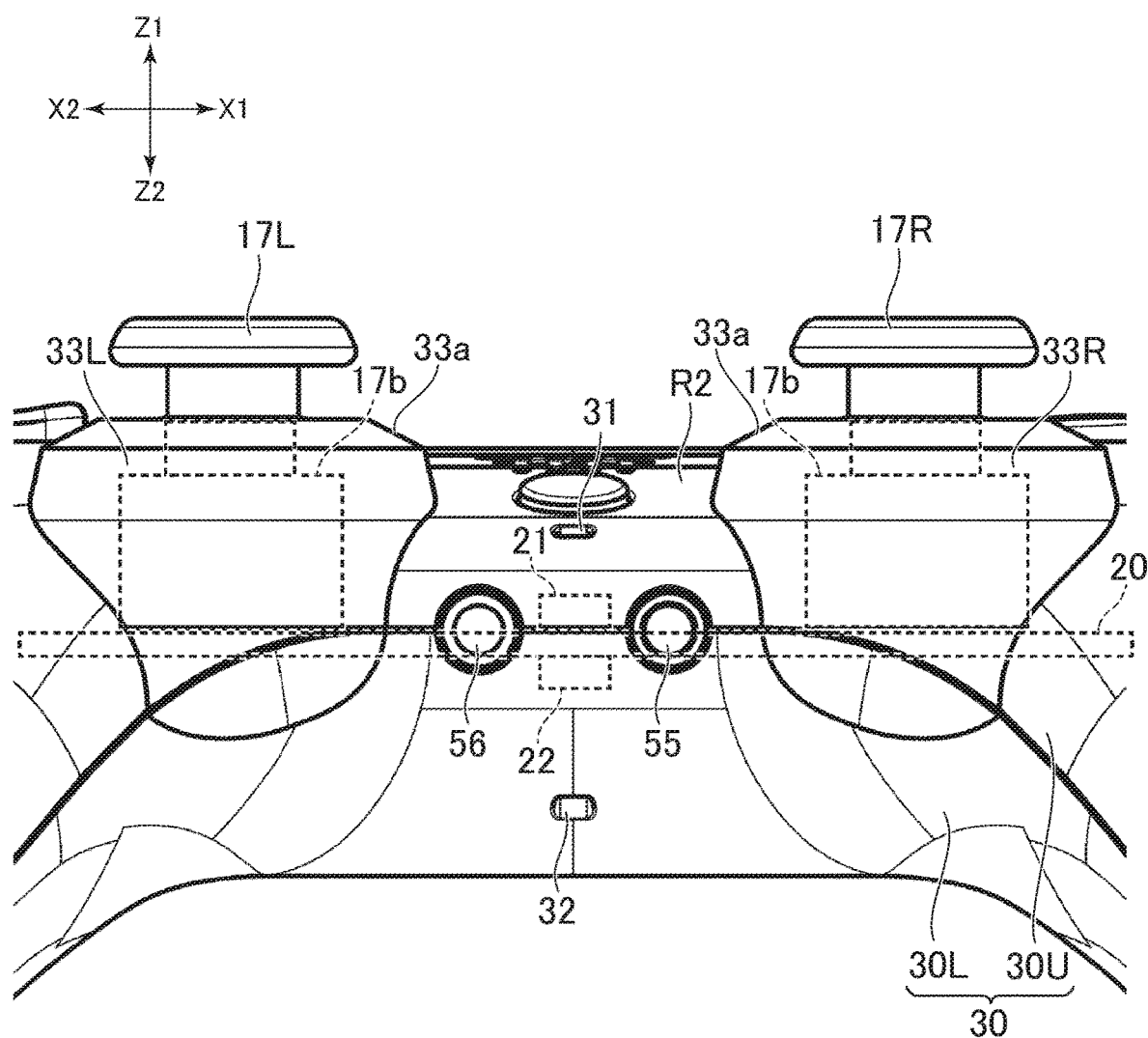
FIG. 2 is a rear view of the input device.

In the following description, directions indicated by X1 and X2 in FIG. 1A represent rightward and leftward directions, respectively, and directions indicated by Y1 and Y2 represent frontward and rearward directions, respectively. Further, directions indicated by Z1 and Z2 in FIG. 2 represent upward and downward directions, respectively.

(Arrangement of Operation Members)

As illustrated in FIG. 1A, the input device 10 has a right held portion 10R to be held by the right hand and a left held portion 10L to be held by the left hand. Operation members are arranged on the upper surface of the right held portion 10R and the upper surface of the left held portion 10L. For example, four operation buttons 11 each located at the apex of a rhombus are arranged on the upper surface of the right held portion 10R. A cross-shaped direction key 12 is arranged on the upper surface of the left held portion 10L. The shape of the direction key 12 does not need to be a cross shape. For example, the direction key 12 may be circular. These operation members are located in front portions of the held portions 10R and 10L. An operation button 13 and a trigger button 14 (see FIG. 3A) located below the operation button 13 are also arranged on each of the front surface of the right held portion 10R and the front surface of the left held portion 10L. Each of the right held portion 10R and the left held portion 10L has a bulge G extending rearward from area Ra in which the operation members on the upper surface (direction key 12 and the four operation buttons 11 in the example of the input device 10) are arranged.

As illustrated in FIG. 1A, the input device 10 has a middle portion 10M located between the right held portion 10R and the left held portion 10L. In the present specification, the middle portion 10M is a portion between the operation members (specifically, the four operation buttons 11) arranged on the upper surface of the right held portion 10R and the operation member (specifically, the direction key 12) arranged on the upper surface of the left held portion 10L. That is, the middle portion 10M is a portion between a straight line passing through the left end of the four operation buttons 11 of the right held portion 10R and a straight line passing through the right end of the direction key 12 of the left held portion 10L. The bulges G of the held portions 10R and 10L extend further rearward than the rear end of the middle portion 10M, but the shape of the input device 10 is not limited to this. In other words, the rear end of the middle portion 10M may reach the rear end of the held portions 10R and 10L.

As illustrated in FIG. 1A, the middle portion 10M has a plate-shaped operation pad 16 constituting the front portion of the upper surface thereof. The operation pad 16 has a touch sensor that detects the position of the part touched by the user's finger. Further, the operation pad 16 can be moved up and down, and also functions as a push button. A switch 51 (see FIG. 3A) for detecting a pressing operation on the operation pad 16 is arranged under the operation pad 16. Further, the middle portion 10M may have an operation button 18 arranged behind the operation pad 16. The operation button 18 functions as, for example, a power button or a home button for displaying an initial screen. Further, the middle portion 10M has operation buttons 19R and 19L separated into right and left. The operation buttons 19R and 19L are shortcut buttons for executing a specific function such as displaying various selection items or transmitting a game image. In the example of the input device 10, the operation button 19R on the right side is located on the right side of the operation pad 16, and the operation button 19L on the left side is located on the left side of the operation pad 16.

As illustrated in FIG. 1A, the input device 10 has operation sticks 17R and 17L that are arranged apart in the right-left direction. In the example of the input device 10, the operation stick 17R on the right side is located behind the four operation buttons 11 provided on the right held portion 10R and is located nearer the center P1 of the input device 10 in relation to the four operation buttons 11 in the right-left direction. The operation stick 17L on the left side is located behind the direction key 12 provided on the left held portion 10L and is located nearer the center P1 of the input device 10 in relation to the direction key 12 in the right-left direction. The operation sticks 17R and 17L can be tilted in the radial direction of the operation sticks 17R and 17L and can be rotated in a tilted state. The operation sticks 17R and 17L may be slidable in the radial direction. The height of the operation sticks 17R and 17L is higher than the heights of other operation members such as the direction key 12 and the operation buttons 11.

The operation sticks 17R and 17L, the four operation buttons 11, and the direction key 12 are operation members that are frequently used in particular during game play. To be more specific, the frequencies of use of the operation sticks 17R and 17L, the four operation buttons 11, and the direction key 12 is higher than those of the operation button 18 and operation buttons 19R and 19L. In the example of the input device 10, the four operation buttons 11 arranged on the right held portion 10R correspond to the "first right operation member" in the claims, and the direction key 12 arranged on the left held portion 10L corresponds to the "first left operation member" in the claims. As illustrated in FIG. 1A, the "first right operation member" is an operation member that intersects a straight line L5 along the side surface of the right held portion 10R. The "first left operation member" is an operation member that intersects a straight line L6 along the side surface of the left held portion 10L. Further, in the example of the input device 10, the right side operation stick 17R corresponds to the "second right operation member" in the claims, and the left side operation stick 17L corresponds to the "second left operation member" in the claims.

The type and arrangement of the operation members are not limited to the example of the input device 10. For example, the operation stick 17R may be arranged at the front portion (positions of the four operation buttons 11) of the right held portion 10R. That is, the "first right operation member" may be the operation stick 17R. Similarly, the operation stick 17L may be arranged at the front portion (position of the direction key 12) of the left held portion 10L. That is, the "first left operation member" may be the operation stick 17L. Further, the operation buttons 11 and the direction key 12 may be arranged at the positions of the operation sticks 17R and 17L on the input device 10. The "second right operation member" and the "second left operation member" may be the operation buttons 11 and the direction key 12. Further, the middle portion 10M does not have to have the plate-shaped operation pad 16.

(Microphone)

Figure 1B:
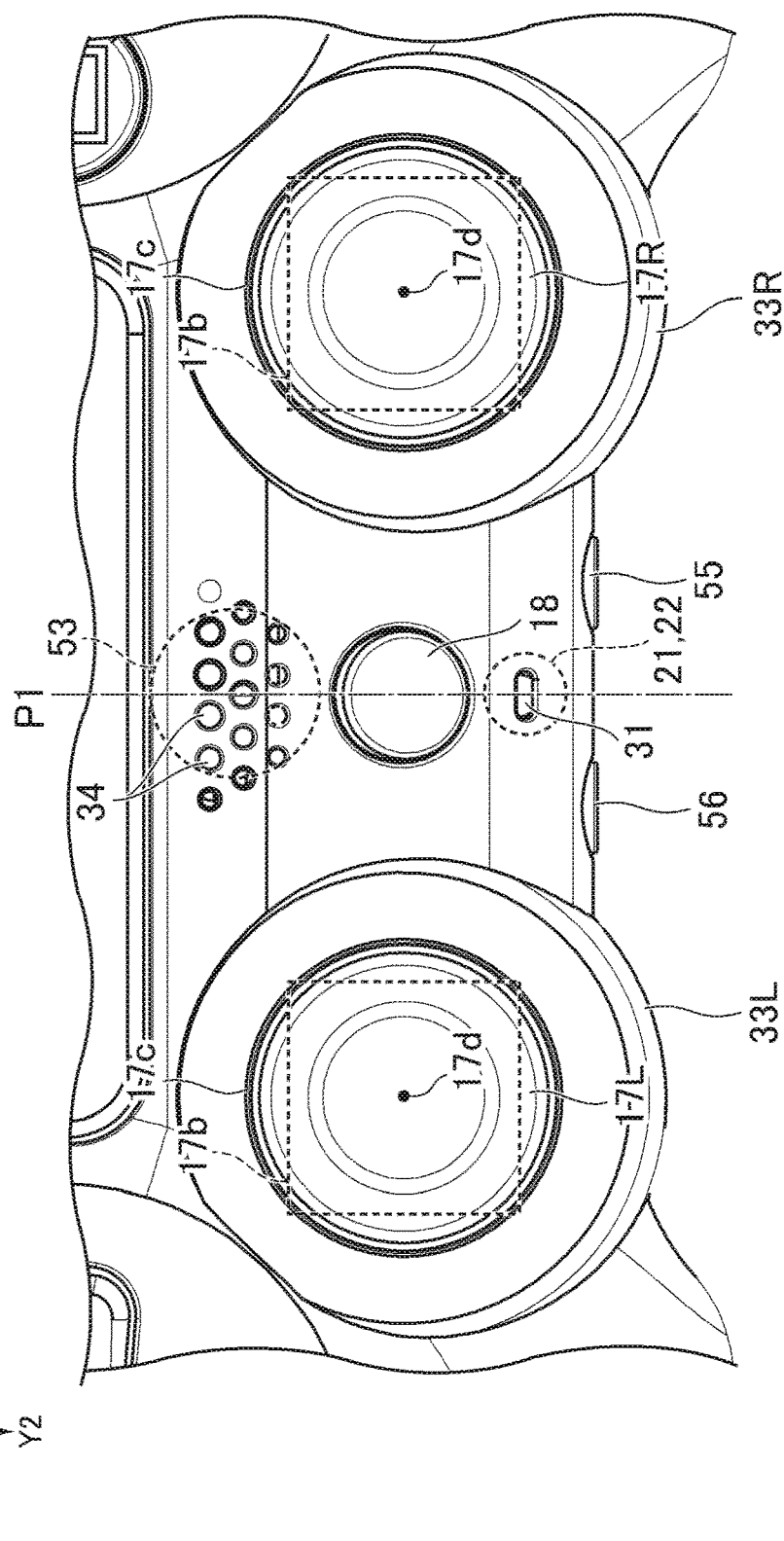
FIG. 1B is an enlarged view of FIG. 1A.

As illustrated in FIGS. 1B and 3A, the input device 10 includes a first microphone 21 and a second microphone 22 inside for acquiring a user's speech voice. The audio data acquired through the microphones 21 and 22 is transmitted to a game device 90 (see FIG. 4) connected to the input device 10 and provided for voice recognition processing, for example. Further, the audio data acquired through the microphones 21 and 22 may be transmitted to the game device 90 and used for voice chat (voice call) with another user. In order to enable voice recognition processing or a voice chat, the input device 10 has an audio input/output circuit 27 (see FIG. 4) to execute beamforming processing for forming directivity with respect to the sensitivities of the microphones 21 and 22. The audio input/output circuit 27 will be described later.

As illustrated in FIGS. 1B and 3A, the first microphone 21 and the second microphone 22 are arranged inside the middle portion 10M. Therefore, the positions of the microphones 21 and 22 are apart from the operation member (four operation buttons 11 in the example of the input device 10) on the upper surface of the right held portion 10R and the operation member (the direction key 12 in the example of the input device 10) on the upper surface of the left held portion 10L. The input device 10 has an exterior member 30 containing a resin (acrylonitrile butadiene styrene (ABS) resin, polycarbonate, etc.) and forming an outer surface of the input device 10. The exterior member 30 has a portion constituting the outer surface of the middle portion 10M, a portion constituting the outer surface of the right held portion 10R, and a portion constituting the outer surface of the left held portion 10L. The microphones 21 and 22 are arranged inside the portion constituting the middle portion 10M. On the outer surface of the portion constituting the middle portion 10M, a first sound hole 31 (see FIG. 3A) that allows a sound propagation toward the first microphone 21 and a second sound hole 32 (see FIG. 3A) that allows a sound propagation toward the second microphone 22 are formed.

In this way, the microphones 21 and 22 are arranged in the middle portion 10M and are apart from the operation members arranged in the right held portion 10R and the left held portion 10L, so that the influence of the user's finger on the sound collection by the first microphone 21 and the influence of the user's finger on the sound collection by the second microphone 22 can be reduced during game play using the input device 10. In other words, it is possible to prevent the user's finger from blocking the arrival of the user's speech voice (target sound) to the first microphone 21 and the user's finger from blocking the arrival of the speech voice to the second microphone 22.

As illustrated in FIG. 1A, a microphone is not arranged on a region Rm1 behind the operation members (four operation buttons 11 in the example of the input device 10) arranged on the upper surface of the right held portion 10R nor a region Rh1 behind the operation member (the direction key 12 in the example of the input device 10) arranged on the upper surface of the left held portion 10L. Further, in the example of the input device 10, a microphone is not placed on a region Rm2 in front of the operation members arranged on the upper surface of the right held portion 10R nor a region Rh2 in front of the operation member arranged on the upper surface of the left held portion 10L. That is, the microphones used for the beamforming processing (namely, the microphones 21 and 22) are arranged at positions where the user's finger is extremely unlikely to block the user's speech voice from reaching the microphones.

In addition, while the input device 10 is held by the user, the microphones 21 and 22 are arranged closer to the user in relation to the operation button 18 and the operation pad 16. That is, the microphones 21 and 22 are arranged at positions where the arrival of the user's speech voice to the microphones is unlikely to be blocked by the user's finger. In the example of the input device 10, the microphones 21 and 22 are arranged on the user side of all the input means arranged on the upper surface of the input device 10 and operated by fingers.

In the example of the input device 10, the second microphone 22 is located below the first microphone 21. The first microphone 21 is directed upward, and the second microphone 22 is directed downward. Therefore, as illustrated in FIG. 3A, the position of the first sound hole 31 for the first microphone 21 and the position of the second sound hole 32 for the second microphone 22 are separated in the vertical direction. The second sound hole 32 is separated downward from the first sound hole 31. Note that, in the example of the input device 10, the sound holes 31 and 32 include not only the portion formed on the outer surface of the exterior member 30, but also the portion (tubular portion) extending from the outer surface toward the microphones 21 and 22.

When the user holds the input device 10, the sound source of the speech voice (user's mouth) is usually located diagonally backward and above the input device 10. Therefore, according to the above-mentioned two sound holes 31 and 32 that are separated in the vertical direction, the distance from the sound source (user's mouth) of the speech voice holding the input device 10 to the first microphone 21 via the first sound hole 31 and the distance from the same sound source to the second microphone 22 via the second sound hole 32 can be made different. In the example of the input device 10, the distance from the user's mouth to the second microphone 22 can be made larger than the distance from the user's mouth to the first microphone 21. As a result, the beam direction of the microphones 21 and 22 (directions in which the sensitivity of the microphone is high) can be set to the direction toward the mouth of the user which is the sound source, and the audio data of the speech voice can be obtained with high accuracy.

Note that, unlike the example of the input device 10, the position of the first sound hole 31 and the position of the second sound hole 32 may be separated in the front-rear direction. Even in this case, the distance from the sound source of the speech voice to the first microphone 21 via the first sound hole 31 and the distance from the same sound source to the second microphone 22 via the second sound hole 32 can be made different. Incidentally, by adjusting the positions of the sound holes 31 and 32 without changing the positions of the microphones 21 and 22, the distance from the sound source to the first microphone 21 via the first sound hole 31 and the distance from the same sound source to the second microphone 22 via the second sound hole 32 can be changed, and the directivity in the beamforming processing can be changed. In contrast, by adjusting the positions of the microphones 21 and 22 without changing the positions of the sound holes 31 and 32, the distance from the sound source to the first microphone 21 via the first sound hole 31 and the distance from the same sound source to the second microphone 22 via the second sound hole 32 can be changed, so that the directivity in the beamforming processing can be changed.

In yet another example, both microphones 21 and 22 may face upward. Then the positions of the two microphones 21 and 22 may be separated in at least one of the front-rear direction and the up-down direction. Even in this case, the distance from the sound source (user's mouth) of the speech voice holding the input device 10 to the first microphone 21 via the first sound hole 31 and the distance from the same sound source to the second microphone 22 via the second sound hole 32 can be made different.

As illustrated in FIG. 1B, the first microphone 21 and the second microphone 22 intersect a plane P1 extending in the front-rear direction and the up-down direction. That is, the first microphone 21 and the second microphone 22 intersect the plane P1 perpendicular to the right-left direction. The first sound hole 31 is formed above the first microphone 21, and the second sound hole 22 is formed above the second microphone 22. Therefore, the sound holes 31 and 32 also intersect the plane P1. According to the arrangement of the sound holes 31 and 32, and the microphones 21 and 22, the environmental sound from a sound source on the left or right side of the input device 10 can effectively be reduced by the beamforming processing.

The plane P1 is desirably a plane that passes through the sound source (user's mouth) of the speech voice and passes through the center extending in the front-rear direction while the user holds the input device 10. In the example of the input device 10, the plane P1 is a plane passing between the right and left operation sticks 17R and 17L. To be more specific, the plane P1 is a plane that passes through the center of the input device 10 in the right-left direction. In other words, the plane P1 is a plane that passes through the middle of the space between the right side surface and the left side surface of the input device 10. Further in other words, the plane P1 is a plane passing through the middle of the space between the right and left held portions 10R and 10L. The center of the first microphone 21 and the center of the first sound hole 31 may be located on the plane P1 or may be deviated from the plane P1. Similarly, the center of the second microphone 22 and the center of the second sound hole 32 may be located on the plane P1 or may be deviated from the plane P1. Further, the plane P1 may be deviated from the center of the input device 10 in the right-left direction. The input device 10 does not need to have a symmetrical shape. In this case, although the plane P1 is not a plane that passes through the center of the input device 10 in the right-left direction, the plane P1 desirably passes through the middle of the space between the right and left held portions 10R and 10L. In this way, the plane P1 becomes a plane that passes through the sound source (user's mouth) of the speech voice and passes through the center extending in the front-back direction while the user holds the input device 10.

As illustrated in FIG. 3A, the input device 10 has a circuit board 20. For example, the switch 51 for detecting a pressing operation on the operation pad 16 described above, a connector 52 for connecting a charging cable, and the like are mounted on the circuit board 20. Further, a plurality of integrated circuits (not illustrated) that function as the audio input/output circuit 27 (see FIG. 6), a control unit 26 (see FIG. 6), and the like are mounted on the circuit board 20.

As illustrated in FIG. 3A, the first microphone 21 is arranged on the upper side of the circuit board 20, and the second microphone 22 is arranged on the lower side of the circuit board 20. Therefore, the position of the second microphone 22 is lower than the position of the first microphone 21. In the example of the input device 10, the first microphone 21 is directly attached to the upper surface of the circuit board 20. Further, the second microphone 22 is directly attached to the lower surface of the circuit board 20.

Therefore, the directions in which the two microphones 21 and 22 are facing are different from each other. To be specific, the first microphone 21 is directed upward and the second microphone 22 is directed downward. As a result, the distance from the sound source of the speech voice (user's mouth) to the second microphone 22 via the second sound hole 32 becomes greater than the distance from the same sound source to the first microphone 21 via the first sound hole 31.

Further, according to the structure in which the first microphone 21 is arranged on the upper side of the circuit board 20 and the second microphone 22 is arranged on the lower side of the circuit board 20, the positions of the two microphones 21 and 22 can be brought together, and the arrangement of the microphones 21 and 22 becomes easy. In the example of the input device 10, as illustrated in FIG. 1B, when the input device 10 is viewed in a direction perpendicular to the circuit board 20, namely, in the plan view of the input device 10, the two microphones 21 and 22 are at least partially overlap with each other. In one example, the center position of the first microphone 21 and the center position of the second microphone 22 coincide with each other. Unlike this, the structure is acceptable in which the center position of the second microphone 22 deviates from the center position of the first microphone 21, and the first microphone 21 and the second microphone 22 only partially overlap with each other in the plan view of the input device 10.

As illustrated in FIG. 1A, in the plan view of the input device 10, the first microphone 21 is located behind the center L1 of the middle portion 10M in the front-rear direction. Due to this arrangement of the first microphone 21, the distance between the sound source of the speech voice (user's mouth) and the first microphone 21 becomes short, so that the speech voice of the user can easily reach the first microphone 21. Further, the second microphone 22 is also located behind the center L1 in the plan view of the input device 10. As a result, the distance between the sound source of the speech voice and the second microphone 22 also becomes short, so that the speech voice can easily reach the second microphone 22. As a result, the directivity of the microphones 21 and 22 can be strengthened toward the sound source of the speech voice.

The orientation, position, and mounting structure of the microphones 21 and 22 are not limited to the examples of the input device 10. The first microphone 21 may be attached at a position separated upward from the circuit board 20. For example, the first microphone 21 may be attached to a frame 40 (see FIG. 3A) arranged on the upper side of the circuit board 20 or the inner surface of the exterior member 30.

Then, the first microphone 21 may be electrically connected to the circuit board 20 via an electric wire. In this way, the distance between the first microphone 21 and the first sound hole 31 can be reduced.

Similarly, the second microphone 22 may be mounted at a position separated downward from the circuit board 20. The second microphone 22 may be attached to the inner surface of a lower case 30L, for example. Then, the second microphone 22 may be electrically connected to the circuit board 20 via an electric wire. In this way, the distance between the second microphone 22 and the second sound hole 32 can be reduced. In this case, the second microphone 22 preferably faces downward.

In yet another example, the input device 10 may have two circuit boards separated in the vertical direction. Then, the first microphone 21 may be mounted on the upper circuit board, and the second microphone 22 may be mounted on the lower circuit board.

As yet another example, in the plan view of the input device 10, the first microphone 21 does not have to have a portion overlapping with the second microphone 22. For example, one of the two microphones 21 and 22 may be located in front of the other microphone.

As still another example, while the first microphone 21 may be arranged to face upward, the second microphone 22 may be arranged to face rearward.

(Positional Relationship Between Microphone and Operation Member)

As illustrated in FIG. 1B, the first microphone 21 is located on the left of the right side operation stick 17R and on the right of the left side operation stick 17L. Further, the first microphone 21 is located behind the front ends 17c of the operation sticks 17R and 17L. That is, the first microphone 21 is located between the right and left operation sticks 17R and 17L. According to this arrangement of the first microphone 21, the influence of the user's fingers used to manipulate the operation sticks 17R and 17L, or the operation members (operation pad 16 and four operation buttons 11 in the example of the input device 10) arranged in front of the operation sticks 17R and 17L on the sound collection by the first microphone 21 can be reduced. In the example of the input device 10, the first microphone 21 is located behind the centers 17d of the right and left operation sticks 17R and 17L.

As described above, a plurality of operation members are arranged on the upper surface of the middle portion 10M. The first microphone 21 is located behind all the operation members arranged on the upper surface of the middle portion 10M. In the example of the input device 10, as illustrated in FIG. 1A, the operation pad 16, operation button 18, and operation buttons 19R and 19L are arranged on the upper surface of the middle portion 10M. Among these operation members 16, 18, 19R, and 19L, the operation button 18 is located at the rearmost position. The first microphone 21 is located behind the operation button 18.

As illustrated in FIG. 3A, the middle portion 10M has a speaker 53 inside. The middle portion 10M has speaker sound holes 34 that emits the sound of the speaker 53 to the outside on the upper surface thereof. The speaker sound holes 34 is located above the speaker 53. In the plan view of the input device 10, the first microphone 21 and the first sound hole 31 are located behind the speaker 53 and the speaker sound holes 34.

As described above, the second microphone 22 is located on the opposite side of the circuit board 20 from the first microphone 21. Therefore, as illustrated in FIG. 1B, the second microphone 22 is located on the left of the right side operation stick 17R and on the right of the left side operation stick 17L, similarly to the first microphone 21. Further, the second microphone 22 is located behind the centers 17d of the operation sticks 17R and 17L in the plan view of the input device 10. That is, the second microphone 22 is located between the right and left operation sticks 17R and 17L. In the example of the input device 10, the first microphone 21 is located behind the centers 17d of the right and left operation sticks 17R and 17L.

The second microphone 22 is also located behind all the operation members arranged on the upper surface of the middle portion 10M in the plan view of the input device 10. In the example of the input device 10, the second microphone 22 is located behind the operation button 18 similarly to the first microphone 21 (see FIG. 1B).

The input device 10 has a battery 54. As illustrated in FIG. 3A, in the example of the input device 10, the battery 54 is arranged inside the middle portion 10M. The battery 54 is located below the circuit board 20. The second microphone 22 arranged on the lower side of the circuit board 20 is arranged so as not to overlap with the battery 54 in the plan view of the input device 10. That is, the second microphone 22 is located outside the outer peripheral edge of the battery 54 in the plan view of the input device 10. Due to this arrangement of the second microphone 22, the second sound hole 32 can be positioned on the lower side in the vertical direction with respect to the second microphone 22. In the example of the input device 10, the second microphone 22 is located behind the rear edge 54a of the battery 54.

(Details of Sound Hole)

Figure 3B:
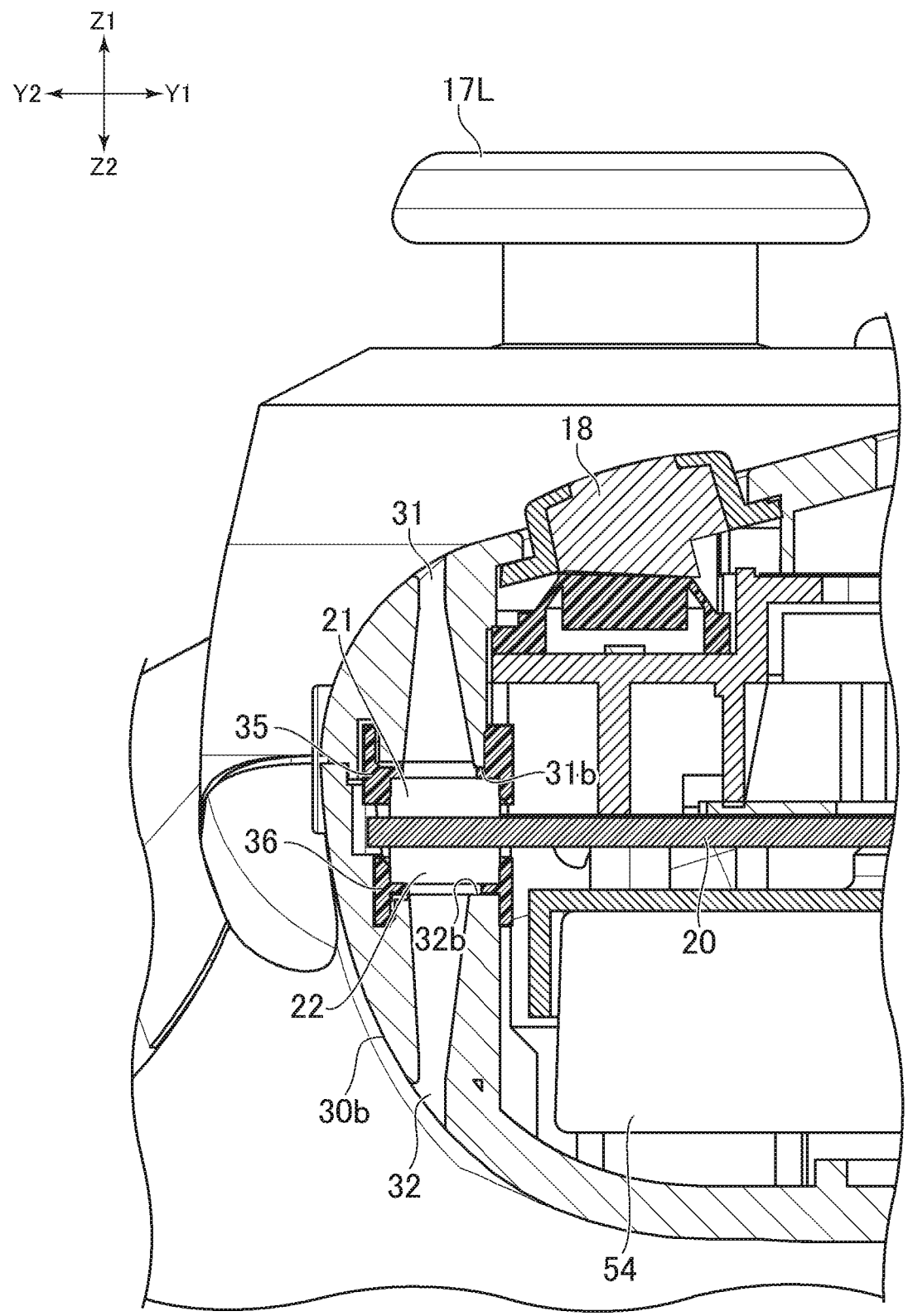
FIG. 3B is an enlarged view of FIG. 3A.

As mentioned above, the first microphone 21 faces upward. Therefore, as illustrated in FIG. 3B, the first sound hole 31 for the first microphone 21 is located above the first microphone 21 and is formed on the upper surface of the middle portion 10M. Further, the second microphone 22 faces downward. Therefore, the second sound hole 32 for the second microphone 22 is formed on the lower surface of the middle portion 10M and is located below the second microphone 22. The exterior member 30 has an upper case 30U that covers the upper side of the components of the input device 10 and the lower case 30L that covers the lower side of the components and is combined with the upper case 30U. The first sound hole 31 is formed in the upper case 30U, and the second sound hole 32 is formed in the lower case 30L.

As illustrated in FIG. 3B, the first sound hole 31 has a tubular shape extending downward from the outer surface (upper surface of the middle portion 10M) of the exterior member 30 toward the first microphone 21. The lower end 31b of the first sound hole 31 is preferably in direct or indirect contact with the first microphone 21. In the example of the input device 10, an annular member 35 containing a material having a lower rigidity than the material of the exterior member 30 (for example, an elastic material such as rubber) is arranged between the lower end 31b of the first sound hole 31 and the first microphone 21. Due to this, the stress acting on the first microphone 21 and the circuit board 20 can be reduced. The first sound hole 31 communicates with the first microphone 21 through the opening of the annular member 35.

As illustrated in FIG. 3B, the size (diameter, width in the front-rear direction, or width in the right-left direction) of the upper end of the first sound hole 31 is smaller than that of the first microphone 21. The size of the first sound hole 31 gradually increases toward the first microphone 21, and the size of the lower end 31b corresponds to the size of the first microphone 21. Unlike the example of the input device 10, the size of the first sound hole 31 may be constant from the upper end to the lower end 31b of the first sound hole 31.

As illustrated in FIG. 3A, the upper surface of the middle portion 10M has a high region R1 that is relatively high and a low region R2 that is relatively low. The first sound hole 31 is formed in the low region R2. As a result, the user's finger is effectively prevented from blocking the first sound hole 31. In the example of the input device 10, the high region R1 is formed in the front portion of the middle portion 10M. The low region R2 is formed behind the high region R1 and is inclined so as to gradually lower toward the rear. Unlike the example of the input device 10, the low region R2 does not need to be inclined. That is, a step may be formed between the low region R2 and the high region R1.

As illustrated in FIG. 2, the exterior member 30 has base covers 33R and 33L that cover bases 17b of the operation sticks 17R and 17L, respectively. The base covers 33R and 33L are annular in a plan view, and the operation sticks 17R and 17L are arranged inside the base covers 33R and 33L. The first sound hole 31 is located between the right and left base covers 33R and 33L, and the position of the first sound hole 31 is lower than the upper ends 33a of the base covers 33R and 33L.

As illustrated in FIG. 3B, a second sound hole 31 has a tubular shape extending upward from the outer surface (lower surface of the middle portion 10M) of the exterior member 30 toward the second microphone 22. The upper end 32b of the second sound hole 32 is preferably in direct or indirect contact with the second microphone 22. In the example of the input device 10, an annular member 36 containing a material having a lower rigidity than the material of the exterior member 30 (for example, an elastic material such as rubber) is arranged between the upper end 32b of the second sound hole 32 and the second microphone 22. Due to this, the stress acting on the second microphone 22 and the circuit board 20 can be reduced. The second sound hole 32 communicates with the second microphone 22 through the opening of the annular member 36.

In the example of the input device 10, as illustrated in FIG. 3B, the size (diameter, width in the front-rear direction, or width in the right-left direction) of the lower end of the second sound hole 32 is smaller than that of the second microphone 22. The size of the second sound hole 32 gradually increases toward the second microphone 22, and the size of the upper end 32b of the second sound hole 32 corresponds to the size of the second microphone 22. Unlike the example of the input device 10, the size of the second sound hole 32 may be constant from the lower end to the upper end 32b of the second sound hole 32.

As illustrated in FIG. 3A, the lower surface of the middle portion 10M has a slope 30b which becomes higher toward the rear at the rear portion. The second sound hole 32 is formed on the slope 30b. Due to this, the position of the second sound hole 32 becomes higher than a flat portion 30c on the lower surface of the middle portion 10M. Therefore, for example, in the case where the user places the input device 10 on the thigh, the second sound hole 32 can be prevented from being blocked by the thigh.

(Other Components)

The input device 10 has a terminal 55 and a switch 56 of the microphones 21 and 22. For example, a headset, headphones, or the like having a microphone is connected to the terminal 55. The switch 56 has a light emitting unit (for example, a light-emitting diode (LED)) built in the outer peripheral portion thereof, and may also function as an indicator indicating an operating state of the input device 10.

As illustrated in FIG. 2, in the example of the input device 10, the terminal 55 and an indicator 56 are mounted on the rear edge of the circuit board 20 and are arranged in the right-left direction. The terminal 55 and the indicator 56 are located between the base covers 33R and 33L that cover the bases 17b of the operation sticks 17R and 17L.

The light emitting unit of the switch 56 emits light in a color corresponding to the operating state of the audio input/output circuit 27 (see FIG. 4), for example. The audio input/output circuit 27 has three states as its operating state, for example. The first state is, for example, a state in which the audio data acquired through the microphones 21 and 22 is converted into data for voice recognition in the game device 90 and is transmitted to the game device 90. The second state is, for example, a state in which audio data acquired through the microphones 21 and 22 is converted into data for voice chat (voice call) with another user and is transmitted to the game device 90. The third state is, for example, a state in which both data for voice chat (voice call) with another user and data for voice recognition in the game device 90 are transmitted to the game device 90. The state indicated by the light emitting unit of the switch 56 is not limited to the example described here.

(Signal Processing)

Figure 4:
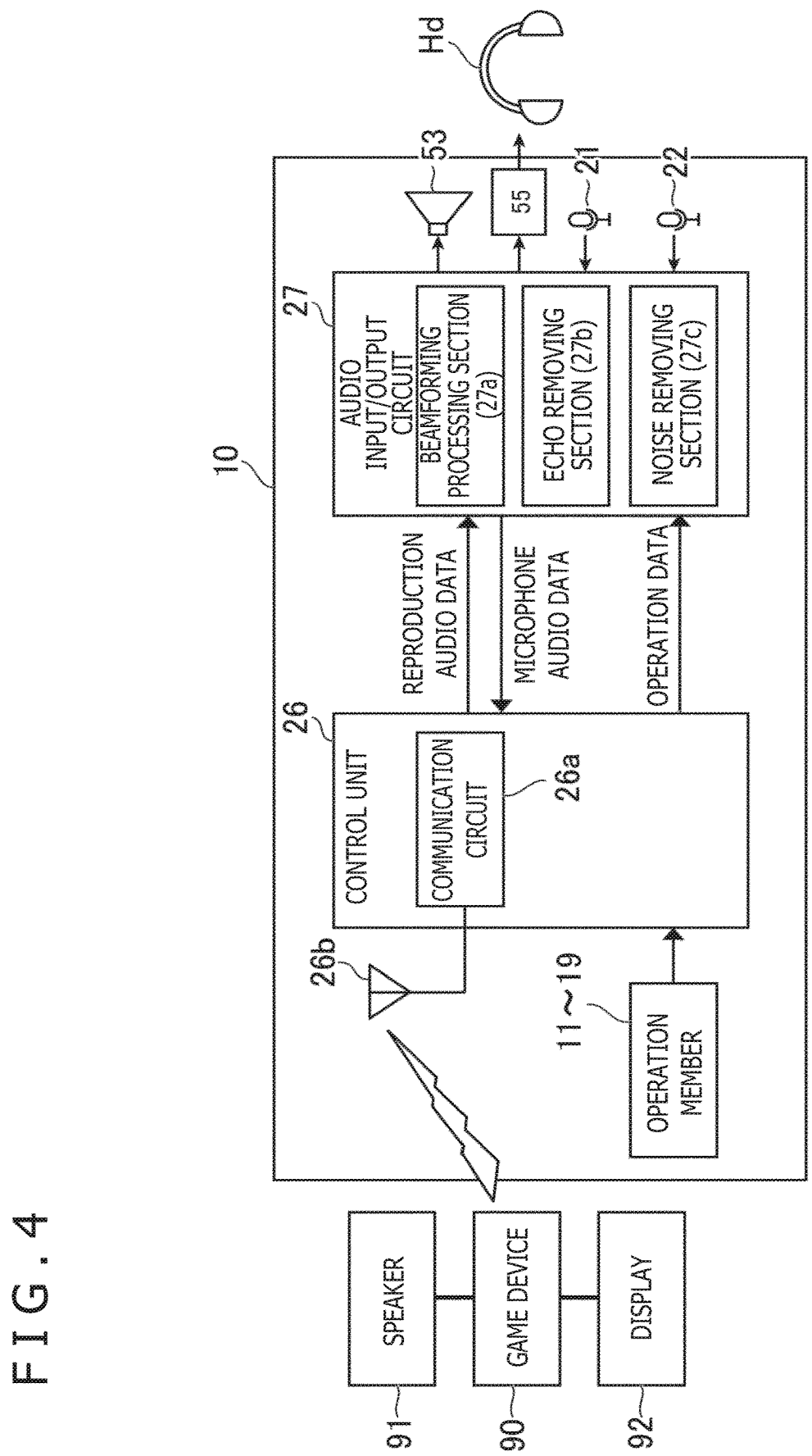
FIG. 4 is a block diagram of a system including the input device.

The configuration of the system 1 including the input device 10 and the processing executed by the input device 10 will be described. As illustrated in FIG. 4, the system 1 includes the input device 10 and the game device 90. The game device 90 may be a device dedicated to a game or may be an information processing device such as a personal computer that executes a game program. The input device 10 and the game device 90 transmit and receive data by wireless communication of a standard such as the Bluetooth (registered trademark) standard. The input device 10 and the game device 90 may be connected by wire for communication according to a standard such as universal serial bus (USB). A display 92 and a speaker 91 are connected to the game device 90.

The input device 10 includes the audio input/output circuit 27, the control unit 26, the speaker 53 (see FIG. 3A), the terminal 55 (see FIG. 2), the microphones 21 and 22, and a plurality of operation members. To be specific, the plurality of operation members are the operation buttons 11, 13, 14, 18, and 19, the operation pad 16, and the operation sticks 17R and 17L described above. In the following description and FIG. 4, these members are referred to as operation members 11 to 19.

The audio input/output circuit 27 is an integrated circuit for controlling audio input/output and has a built-in digital signal processor that executes audio signal processing. The audio input/output circuit 27 outputs audio from either headphones Hd connected to the terminal 55 or the speaker 53 on the basis of the audio data received by the control unit 26 from the game device 90. Further, the audio input/output circuit 27 executes necessary audio signal processing on the audio data obtained through the microphones 21 and 22, and then outputs the audio data to the control unit 26.

The control unit 26 is an integrated circuit for controlling each part of the input device 10. The control unit 26 has a communication circuit 26a. The communication circuit 26a controls wireless communication for interchanging information with the game device 90 via an antenna 26b. To be specific, the communication circuit 26a receives audio data for reproduction with the speaker 53 or the headphones Hd from the game device 90. Further, the control unit 26 sends audio data obtained by applying audio signal processing to the audio data from the microphones 21 and 22, data indicating the user's operation contents for the operation members 11 to 19, and the like to the game device 90.

The speaker 53 reproduces monaurally the sound based on the audio data received from the game device 90. When the headphones Hd are connected to the terminal 55, the audio input/output circuit 27 reproduces the sound based on the audio signal received from the game device 90 with the headphones Hd instead of the speaker 53.

Hereinafter, the audio data acquired through the microphones 21 and 22 is referred to as microphone audio data, and the audio data received from the game device 90 for reproduction by the speaker 53 of the input device 10 or the headphones Hd are referred to as reproduction audio data.

The game device 90 executes voice recognition processing on the microphone audio data received from the input device 10. Further, in order to perform reproduction from the microphone audio data in another place, the audio data is transmitted to another game device (information processing device) (voice call).

As illustrated in FIG. 4, the audio input/output circuit 27 has a beamforming processing section 27a, an echo removing section 27b, and a noise removing section 27c as its functions.

The beamforming processing section 27a generates microphone audio data having directivity. In other words, the beamforming processing section 27a generates data in which the data (signal) representing the user's speech voice is emphasized in the microphone audio data obtained from the microphones 21 and 22. The beamforming processing section 27a compensates for the propagation delay of the microphone audio data obtained from the second microphone 22, for example, and adds the compensated microphone audio data to the microphone audio data obtained from the first microphone 21.

The echo removing section 27b executes the echo removing processing on the microphone audio data generated by the beamforming processing section 27a. This is processing of removing the acoustic echo generated by the microphones 21 and 22 acquiring the sound reproduced with the speaker 53 from the microphone audio data. The echo removing section 27b, for example, removes the reproduction audio data output by the audio input/output circuit 27 to the speaker 53 from the microphone audio data generated by the beamforming processing section 27a.

The noise removing section 27c executes noise removing processing for removing noise from the microphone audio data after echo removal. The noise removing section 27c performs the noise removing processing by utilizing the user's operation input for a part or all of the operation members 11 to 19. When the operation input is performed to the operation members 11 to 19, an operation sound is generated, and the operation sound is included as noise in the microphone audio data. In the case where the user performs operation inputs to a part or all of the operation members 11 to 19, the control unit 26 inputs a signal indicating that the operation input has been made to the audio input/output circuit 27. Upon receiving the signal, the noise removing section 27c executes processing for removing noise on the assumption that the audio data obtained at that timing contains noise (operation sound). For example, when the operation members 11 to 19 are operated, the microphone audio data is subjected to filter processing preset according to the operation sound of the operation members 11 to 19.

SUMMARY

As described above, the input device 10 has the right held portion 10R having the upper surface on which the operation buttons 11 (first right operation member) operated by the fingers of the right hand is arranged, and the left held portion 10L having an upper surface on which the direction key 12 (first left operation member) operated by the fingers of the left hand is arranged, and the middle portion 10M located between and the right held portion 10R and the left held portion 10L. Further, the input device 10 has the first microphone 21 arranged in the middle portion 10M and the second microphone 22 also arranged in the middle portion 10M. The first microphone 21 is located behind the center of the middle portion 10M in the front-rear direction (straight line L1 (see FIG. 1A)).

According to this structure, the processing by the beamforming processing section 27a can be executed by using the audio data obtained by the two microphones 21 and 22. Further, since the distance between the sound source (user's mouth) of the speech voice of the user holding the input device 10 and the first microphone 21 becomes closer, the speech voice of the user can easily reach the first microphone 21.

Further, in the example of the input device 10, the position of the first sound hole 31 and the position of the second sound hole 32 are separated in the vertical direction. According to this arrangement, the distance from the mouth of the user holding the input device 10 to the first microphone 21 via the first sound hole 31 and the distance from the user's mouth to the second microphone 22 via the second sound hole 32 can be made different from each other. As a result, the beams of the microphones 21 and 22 can be directed to the user's mouth, which is a sound source, and the user's speech voice can be obtained with high accuracy. The position of the first sound hole 31 and the position of the second sound hole 32 may be separated in the front-rear direction. Even in this case, the distance from the user's mouth to the first microphone 21 and the distance from the user's mouth to the second microphone 22 can be made different.

During the execution of the game, sound (game sound) is output from the speaker 91 connected to the game device 90. The speaker 91 may be arranged in front of the user together with the display 92. According to the structure in which the position of the first sound hole 31 (or the first microphone 21) and the position of the second sound hole 32 (or the second microphone 22) are separated in at least one of the front-rear direction and the up-down direction, not only the speech voice of the user, but also the sound output from the speaker 91 arranged in front of the user may reach the microphones 21 and 22 and the sound may be mixed with the microphone audio data processed by the beamforming processing section 27a (hereinafter, the sound output from the speaker 91 is referred to as "interfering sound"). In this case, the echo removing section 27b of the game device 90 or the input device 10 may execute processing of removing the interfering sound from the microphone audio data processed by the beamforming processing section 27a. For example, the audio data output by the game device 90 to the speaker 91 may be removed from the microphone audio data processed by the beamforming processing section 27a.

Modification Example

Incidentally, the input device proposed in the present disclosure is not limited to the example illustrated in the above-mentioned input device 10.

Figure 5:
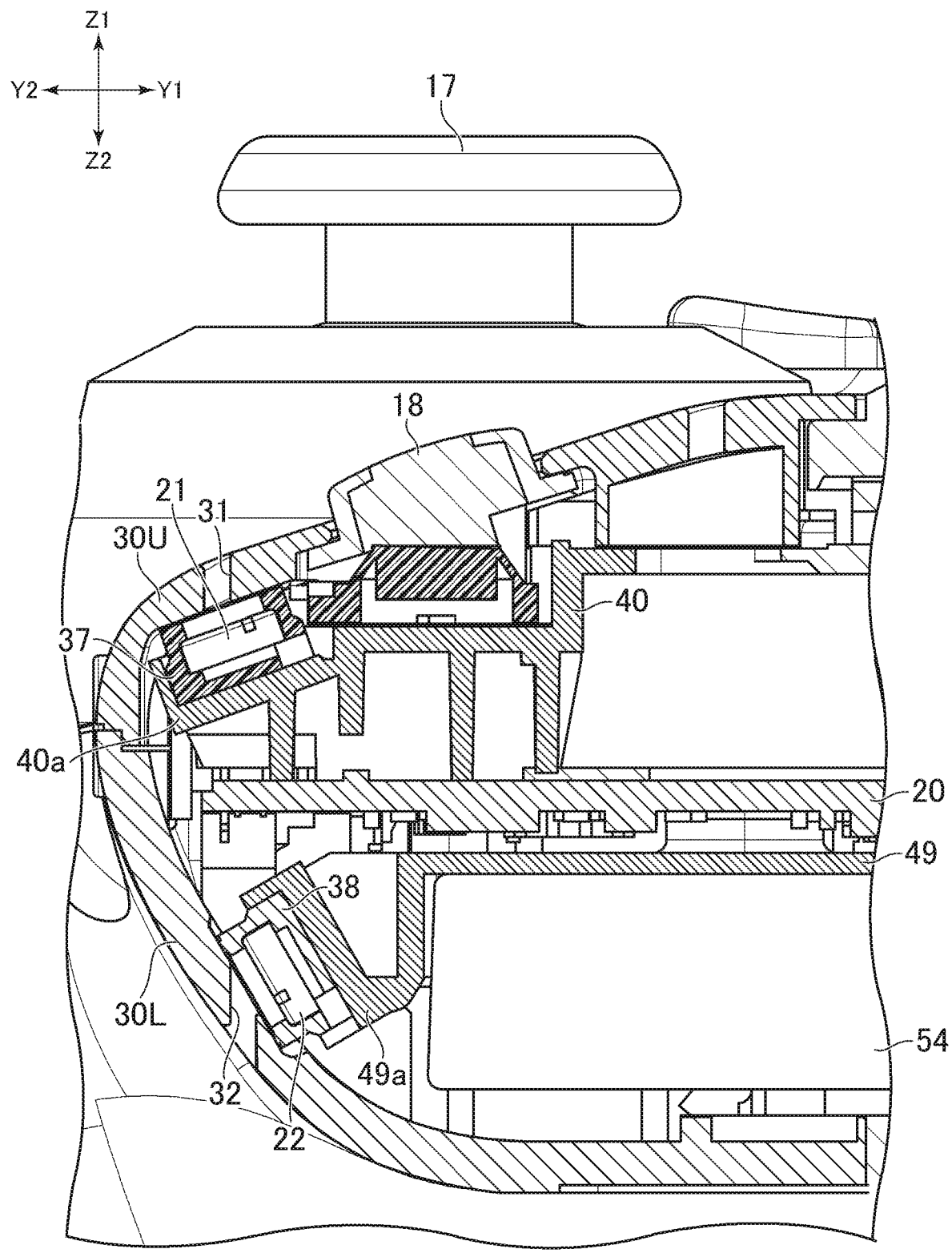
FIG. 5 is a cross-sectional view illustrating another example of a microphone mounting structure.

FIG. 5 is a cross-sectional view illustrating another example of the mounting structure of the microphones 21 and 22. The position of the cutting plane in this figure is the same as in FIGS. 3A and 3B. Hereinafter, the points different from the structure of the input device 10 illustrated in FIGS. 3A and 3B will be mainly described. Matters not described in FIG. 5 may be the same as the structures described in FIGS. 3A and 3B.

In FIG. 5, the first microphone 21 and the second microphone 22 are arranged on opposite sides of the circuit board 20 and are separated from the circuit board 20 in the vertical direction. The first microphone 21 is separated upward from the circuit board 20. The second microphone 22 is separated downward from the circuit board 20. The depth (length) of the first sound hole 31 and the second sound hole 32 can be shortened, and the sound acquisition by the microphones 21 and 22 can be made more efficient. As a result, for example, the sizes (width in the vertical direction and the horizontal direction) of the sound holes 31 and 32 can be reduced. The microphones 21 and 22 and the circuit board 20 are electrically connected by electric wires (not illustrated).

As described above, the frame 40 is arranged on the upper side of the circuit board 20. The frame 40 supports, for example, a sensor (switch) for detecting the movement of an operation member (for example, the operation buttons 11 or the direction key 12) provided on the upper surface of the input device 10. In the example of FIG. 5, the first microphone 21 is supported by the frame 40. The frame 40 has a microphone support portion 40a to which the first microphone 21 is attached at the rearmost portion thereof. The first microphone 21 is held by a holder 37 containing a material having cushioning properties and is attached to the microphone support portion 40a together with the holder 37.

As described above, the battery 54 is arranged under the circuit board 20. The battery 54 has a battery holder 49. The battery holder 49 is fixed to, for example, the circuit board 20 or the inner surface of the exterior member 30 (specifically, the lower case 30L). The second microphone 22 is supported by the battery holder 49. The battery holder 49 has a microphone support 49a to which the second microphone 22 is attached at the rearmost portion thereof. The second microphone 22 is held by a holder 38 containing a material having cushioning properties and is attached to the microphone support 49a together with the holder 38.

The frame 40 and the battery holder 49 are components constituted by resin. In this way, the microphones 21 and 22 are supported by the molded products arranged in the exterior member 30. Due to this, a high degree of freedom can be ensured regarding the positions and postures of the microphones 21 and 22. Incidentally, the microphones 21 and 22 may be supported by components different from the frame 40 and the battery holder 49.

The first microphone 21 is arranged along the inner surface of the exterior member 30 (specifically, the upper case 30U). The first microphone 21 is parallel to the inner surface of the upper case 30U, and faces upward and diagonally backward in the example illustrated in FIG. 5. The holder 37 holding the first microphone 21 is annular, and its outer peripheral edge is pressed against the inner surface of the upper case 30. Due to this, the sound passing through the first sound hole 31 can efficiently be acquired by the first microphone 21. The second microphone 22 is arranged along the inner surface of the exterior member 30 (specifically, the lower case 30L). The second microphone 22 is parallel to the inner surface of the lower case 30L, and faces downward and diagonally backward in the example illustrated in FIG. 5. The holder 38 holding the second microphone 22 is annular, and its outer peripheral edge is pressed against the inner surface of the lower case 30L. Due to this, the sound passing through the second sound hole 32 can efficiently be acquired by the second microphone 22.

The first sound hole 31 and the second sound hole 32 are formed obliquely with respect to the inner surface of the exterior member 30. To be specific, the portion of the exterior member 30 which the first microphone 21 faces, downwardly extends rearward, whereas the first sound hole 31 is formed in the vertical direction (direction perpendicular to the circuit board 20). Further, the portion of the exterior member 30 which the second microphone 22 faces, upwardly extends rearward, whereas the second sound hole 32 is formed in the vertical direction. This makes it easy to secure the distance to the microphones 21 and 22 via the sound holes 31 and 32.

Figure 6:
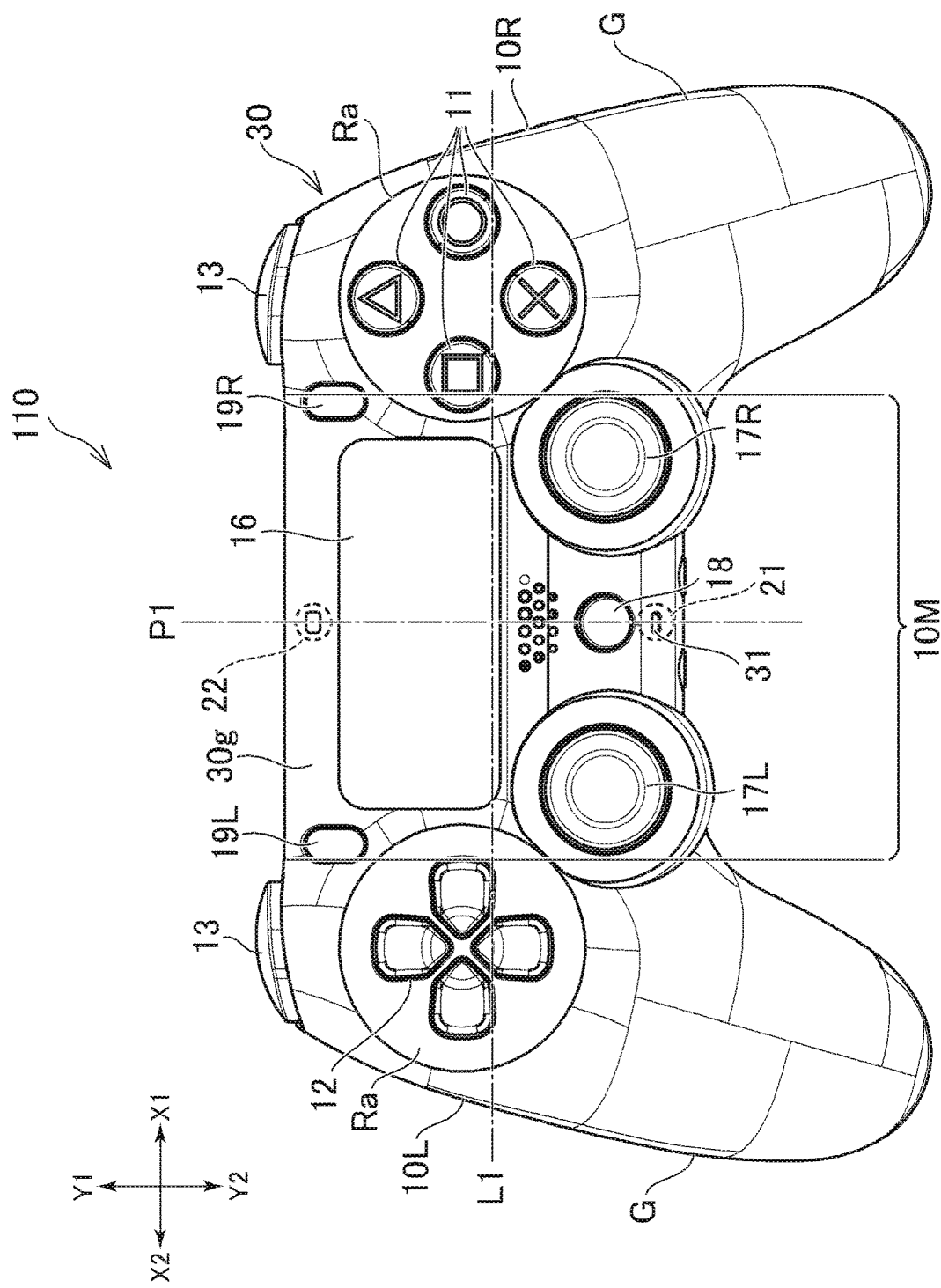
FIG. 6 is a plan view illustrating another example of the input device proposed in the present disclosure.

FIG. 6 is a plan view of an input device 110, which is another example of the input device proposed in the present disclosure. Hereinafter, the input device 110 will be described focusing on the points different from the input device 10. The structure of the input device 10 may be applied to matters not described for the input device 110.

The input device 110 is different from the above-mentioned input device 10 in terms of the positions of the second microphone 22 and the second sound hole 32. In the input device 110, the second microphone 22 is arranged on the upper side of the circuit board 20 like the first microphone 21. Then, the second microphone 22 is located in front of the first microphone 21. The first microphone 21 and the second microphone 22 intersect the plane P1 extending in the front-rear direction and the up-down direction.

The second sound hole 32 is formed above the second microphone 22. In the input device 110, the exterior member 30 has a foremost portion 30g located in front of the operation pad 16 and extending in the right-left direction. The second sound hole 22 is formed in the foremost portion 30g. In this case, the second microphone 22 may be directly attached to the foremost portion of the circuit board 20. In another example, the second microphone 22 may be attached to the inner surface of the exterior member 30 in the vicinity of the second sound hole 22 or may be attached to the frame 40 (see FIG. 3A). Even with such a structure of the input device 110, the distance from the mouth of the user holding the input device 110 to the first microphone 21 via the first sound hole 31 and the distance from the user's mouth to the second microphone 22 via the second sound hole 32 can be made different.

The input devices 10 and 110 are provided with the two microphones 21 and 22 described above. The number of microphones is preferably two or three. By doing so, excellent beamforming processing can be performed while suppressing the cost increase due to the mounting of the microphones. In the case where there are three microphones, the third microphone may also be located on the plane P1 (FIG. 1A) described above. In this case, the second microphone 22 may be located below the circuit board 20 as illustrated in FIG. 3A and the like, and the third microphone may be located at the position of the second microphone 22 illustrated in FIG. 6.

It should be noted that the right held portion 10R on which the operation member operated by the fingers of the right hand is arranged and the left held portion 10L on which the operation member operated by the fingers of the left hand is arranged may be separated in the front-rear direction like a gun controller, for example. In this case, the plane P1 (FIG. 1A) on which the microphones 21 and 22 are arranged may be a plane passing through the middle of the space between the right side surface and the left side surface of the controller.

Further, the sound holes 31 and 32 do not need to be tubular. That is, although the sound holes 31 and 32 penetrate the outer surface of the exterior member 30, they do not have to have portions extending toward the microphones 21 and 22.

The invention claimed is:

1. An exterior member for an input device, comprising:
a housing having an upper member and a lower member that is combined with the upper member in a vertical direction, wherein the housing includes an upper surface on which one or more operation members for manipulation by a user are arranged, and a middle portion located between right and left portions, respectively of the housing;
a first sound hole formed in the upper member, wherein the first sound hole extends from an exterior, through the exterior member, to an interior of the housing such that the first sound hole allows sound to propagate to a first location within the housing; and
a second sound hole formed in the lower member, wherein:
the second sound hole extends from the exterior, through the exterior member, to the interior of the housing such that the second sound hole allows sound to propagate to a second location within the housing; and
a position of the first sound hole and a position of the second sound hole are separated in at least one of a front-rear direction and an up-down direction.

2. The exterior member according to claim 1, wherein the first sound hole and the second sound hole intersects with a plane along the front-rear direction and the up-down direction.

3. The exterior member according to claim 1, wherein the housing includes an upper surface of the middle portion having a high region and a low region,
the upper surface of the middle portion is formed obliquely so as to descend rearward in the low region from the high region, and
the first sound hole is formed in the low region.

4. The exterior member according to claim 2, wherein the housing further comprises:
a right held portion located at the right portion of the housing having an upper surface on which a first right operation member operated by a finger of a right hand of the user is arranged;
a left held portion located at the left portion of the housing having an upper surface on which a first left operation member operated by a finger of a left hand of the user is arranged;
a second right operation member located behind the first right operation member of the right held portion and on a right side of a center of the input device in a right-left direction; and
a second left operation member located behind the first left operation member of the left held portion and on a left side of the center of the input device in the right-left direction,
wherein the plane passes between the second right operation member and the second left operation member.

5. The exterior member according to claim 4, wherein the plane passes through a center of the input device in a right-left direction.

6. The exterior member according to claim 4, wherein neither the first sound hole nor the second sound hole are arranged at the first right operation member nor behind the first left operation member.

7. The exterior member according to claim 4, wherein at least one of the first sound hole and the second sound hole is located between the second right operation member and the second left operation member.

8. The exterior member according to claim 1, wherein the first sound hole is directed upward, the second sound hole is directed downward.

9. The exterior member according to claim 8, wherein the first sound hole and the second sound hole are located at the center of the middle portion in the front-rear direction.

10. The exterior member according to claim 1, wherein a direction in which the first sound hole faces is different from a direction in which the second sound hole faces.

11. The exterior member according to claim 1, wherein the first sound hole and the second sound hole are at least partially overlapped with each other in a plan view of the input device.

12. The exterior member according to claim 1, further comprising a circuit board arranged within the housing, wherein:
the first sound hole is arranged above the circuit board, and
the second sound hole is arranged below the circuit board.

13. The exterior member according to claim 1, wherein the first sound hole and the second sound hole are arranged at a rear end of the housing.

14. An exterior member for an input device, comprising:
a housing having an upper surface on which one or more operation members for manipulation by a user are arranged, and a middle portion located between right and left portions, respectively of the housing;
a first sound hole extending from an exterior, through the exterior member, to an interior of the housing such that the first sound hole allows sound to propagate to a first location within the housing, wherein the first sound hole is directed upward; and
a second sound hole extending from the exterior, through the exterior member, to the interior of the housing such that the second sound hole allows sound to propagate to a second location within the housing, wherein:
a position of the first sound hole and a position of the second sound hole are separated in at least one of a front-rear direction and an up-down direction; and
the second sound hole is directed downward.

15. The exterior member according to claim 14, wherein the first sound hole and the second sound hole intersects with a plane along the front-rear direction and the up-down direction.

16. The exterior member according to claim 14, wherein the housing includes an upper surface of the middle portion having a high region and a low region,
the upper surface of the middle portion is formed obliquely so as to descend rearward in the low region from the high region, and
the first sound hole is formed in the low region.

17. An exterior member for an input device, comprising:
a housing having an upper surface on which one or more operation members for manipulation by a user are arranged, and a middle portion located between right and left portions, respectively of the housing;
a circuit board arranged within the housing;
a first sound hole extending from an exterior, through the exterior member, to an interior of the housing such that the first sound hole allows sound to propagate to a first location within the housing, wherein the first sound hole is arranged above the circuit board; and
a second sound hole extending from the exterior, through the exterior member, to the interior of the housing such that the second sound hole allows sound to propagate to a second location within the housing, wherein:
a position of the first sound hole and a position of the second sound hole are separated in at least one of a front-rear direction and an up-down direction; and
the second sound hole is arranged below the circuit board.

18. The exterior member according to claim 17, wherein the first sound hole and the second sound hole intersects with a plane along the front-rear direction and the up-down direction.

19. The exterior member according to claim 17, wherein the housing includes an upper surface of the middle portion having a high region and a low region,
the upper surface of the middle portion is formed obliquely so as to descend rearward in the low region from the high region, and
the first sound hole is formed in the low region.

* * * * *